United States Patent
Cutler et al.

(10) Patent No.: US 7,343,289 B2
(45) Date of Patent: Mar. 11, 2008

(54) SYSTEM AND METHOD FOR AUDIO/VIDEO SPEAKER DETECTION

(75) Inventors: Ross Cutler, Duvall, WA (US); Ashish Kapoor, Jaipur (IN)

(73) Assignee: Microsoft Corp., Redmond, WA (US)

( * ) Notice: Subject to any disclaimer, the term of this patent is extended or adjusted under 35 U.S.C. 154(b) by 898 days.

(21) Appl. No.: 10/606,061

(22) Filed: Jun. 25, 2003

(65) Prior Publication Data

US 2004/0267521 A1   Dec. 30, 2004

(51) Int. Cl.
G10L 13/00   (2006.01)

(52) U.S. Cl. ..................................... 704/259
(58) Field of Classification Search ................ 704/259
See application file for complete search history.

(56) References Cited

U.S. PATENT DOCUMENTS

| | | | |
|---|---|---|---|
| 5,539,483 A | | 7/1996 | Nalwa |
| 5,586,215 A | * | 12/1996 | Stork et al. ................ 704/232 |
| 5,745,305 A | | 4/1998 | Nalwa |
| 5,793,527 A | | 8/1998 | Nalwa |
| 5,990,934 A | | 11/1999 | Nalwa |
| 6,005,611 A | | 12/1999 | Gullichsen et al. |
| 6,043,837 A | | 3/2000 | Driscoll, Jr. et al. |
| 6,111,702 A | | 8/2000 | Nalwa |
| 6,115,176 A | | 9/2000 | Nalwa |
| 6,128,143 A | | 10/2000 | Nalwa |
| 6,141,145 A | | 10/2000 | Nalwa |
| 6,144,501 A | | 11/2000 | Nalwa |
| 6,175,454 B1 | | 1/2001 | Hoogland et al. |
| 6,195,204 B1 | | 2/2001 | Nalwa |
| 6,219,089 B1 | | 4/2001 | Driscoll, Jr. et al. |
| 6,219,090 B1 | | 4/2001 | Nalwa |
| 6,219,639 B1 | * | 4/2001 | Bakis et al. ................ 704/246 |
| 6,219,640 B1 | * | 4/2001 | Basu et al. ................. 704/246 |
| 6,222,683 B1 | | 4/2001 | Hoogland et al. |
| 6,285,365 B1 | | 9/2001 | Nalwa |
| 6,313,865 B1 | | 11/2001 | Driscoll, Jr. et al. |
| 6,331,869 B1 | | 12/2001 | Furlan et al. |
| 6,337,708 B1 | | 1/2002 | Furlan et al. |
| 6,341,044 B1 | | 1/2002 | Driscoll, Jr. et al. |
| 6,346,967 B1 | | 2/2002 | Gullichsen et al. |
| 6,356,296 B1 | | 3/2002 | Driscoll, Jr. et al. |
| 6,356,397 B1 | | 3/2002 | Nalwa |
| 6,369,818 B1 | | 4/2002 | Hoffman et al. |

(Continued)

OTHER PUBLICATIONS

Cutler, R. and Davis, L. "Look Who's Talking: Speaker Detection Using Video and Audio Correlation". *IEEE International Conference on Multimedia and Expo 2000*, New York, New York. 2000.

*Primary Examiner*—David Hudspeth
*Assistant Examiner*—Jakieda Jackson
(74) *Attorney, Agent, or Firm*—Lyon & Harr, LLP; Katrina A. Lyon (57) ABSTRACT

A system and method for detecting speech utilizing audio and video inputs. In one aspect, the invention collects audio data generated from a microphone device. In another aspect, the invention collects video data and processes the data to determine a mouth location for a given speaker. The audio and video are inputted into a time-delay neural network that processes the data to determine which target is speaking. The neural network processing is based upon a correlation to detected mouth movement from the video data and audio sounds detected by the microphone.

30 Claims, 10 Drawing Sheets

U.S. PATENT DOCUMENTS

| | | |
|---|---|---|
| 6,373,642 B1 | 4/2002 | Wallerstein et al. |
| 6,388,820 B1 | 5/2002 | Wallerstein et al. |
| 6,392,687 B1 | 5/2002 | Driscoll, Jr. et al. |
| 6,424,377 B1 | 7/2002 | Driscoll, Jr. et al. |
| 6,426,774 B1 | 7/2002 | Driscoll, Jr. et al. |
| 6,459,451 B2 | 10/2002 | Driscoll, Jr. et al. |
| 6,466,254 B1 | 10/2002 | Furlan et al. |
| 6,480,229 B1 | 11/2002 | Driscoll, Jr. et al. |
| 6,493,032 B1 | 12/2002 | Wallerstein et al. |
| 6,515,696 B1 | 2/2003 | Driscoll, Jr. et al. |
| 6,539,547 B2 | 3/2003 | Driscoll, Jr. et al. |
| 6,567,775 B1 * | 5/2003 | Maali et al. ............. 704/231 |
| 6,583,815 B1 | 6/2003 | Driscoll, Jr. et al. |
| 6,593,969 B1 | 7/2003 | Driscoll, Jr. et al. |
| 6,597,520 B2 | 7/2003 | Wallerstein et al. |
| 6,700,711 B2 | 3/2004 | Nalwa |
| 6,707,921 B2 * | 3/2004 | Moore ..................... 381/327 |
| 6,735,566 B1 * | 5/2004 | Brand ..................... 704/256 |
| 6,741,250 B1 | 5/2004 | Furlan et al. |
| 6,756,990 B2 | 6/2004 | Koller |
| 6,885,509 B2 | 4/2005 | Wallerstein et al. |
| 6,924,832 B1 | 8/2005 | Shiffer et al. |
| 7,165,029 B2 * | 1/2007 | Nefian ..................... 704/236 |
| 2002/0034020 A1 | 3/2002 | Wallerstein et al. |
| 2002/0063802 A1 | 5/2002 | Gullichsen et al. |
| 2002/0094132 A1 | 7/2002 | Hoffman et al. |
| 2002/0154417 A1 | 10/2002 | Wallerstein et al. |
| 2003/0142402 A1 | 7/2003 | Carbo, Jr. et al. |
| 2003/0193606 A1 | 10/2003 | Driscoll, Jr. et al. |
| 2003/0193607 A1 | 10/2003 | Driscoll, Jr. et al. |
| 2003/0212552 A1 * | 11/2003 | Liang et al. ............. 704/231 |
| 2004/0008407 A1 | 1/2004 | Wallerstein et al. |
| 2004/0008423 A1 | 1/2004 | Driscoll, Jr. et al. |
| 2004/0021764 A1 | 2/2004 | Driscoll, Jr. et al. |
| 2004/0122675 A1 * | 6/2004 | Nefian et al. ............. 704/276 |
| 2004/0252384 A1 | 12/2004 | Wallerstein et al. |
| 2004/0254982 A1 | 12/2004 | Hoffman et al. |
| 2004/0267521 A1 * | 12/2004 | Cutler et al. ............. 704/202 |

* cited by examiner

|  | | Detected | | |
|---|---|---|---|---|
|  | | Ross Speaking | Ashish Speaking | Silence |
| Actual | Ross Speaking | 7 | 0 | 0 |
|  | Ashish Speaking | 0 | 18 | 2 |
|  | Silence | 0 | 4 | 1 |

Video Only: Accuracy = *81.25%*

FIG. 11A

|  | | Detected | | |
|---|---|---|---|---|
|  | | Ross Speaking | Ashish Speaking | Silence |
| Actual | Ross Speaking | 3 | 0 | 4 |
|  | Ashish Speaking | 2 | 2 | 16 |
|  | Silence | 2 | 0 | 3 |

Audio Only: Accuracy =25%

FIG. 11B

|  | | Detected | | |
|---|---|---|---|---|
|  | | Ross Speaking | Ashish Speaking | Silence |
| Actual | Ross Speaking | 7 | 0 | 0 |
|  | Ashish Speaking | 0 | 20 | 0 |
|  | Silence | 0 | 3 | 2 |

Audio & Video: Accuracy = *90.625%*

FIG. 11C

SYSTEM AND METHOD FOR AUDIO/VIDEO SPEAKER DETECTION

BACKGROUND

1. Technical Field

This invention is directed toward a system and method for using audio and video signals to detect a speaker. More specifically, the invention is directed toward a system and method for utilizing audio and video spatial and temporal correlation to robustly detect speakers in an audio/video sequence.

2. Background Art

The visual motion of a speaker's mouth is highly correlated with the audio data generated from the voice box and mouth. This fact has been exploited for applications such as lip/speech reading and for combined audio-visual speech recognition.

Applications where speaker detection is of importance include video conferencing, video indexing, and improving the human computer interface, to name a few. In video conferencing, knowing where someone is speaking can cue a video camera to zoom in on the speaker; it can also be used to transmit only the speaker's video in bandwidth-limited conferencing applications. Speaker detection can also be used to index video (e.g., to locate when someone is speaking), and can be combined with face recognition techniques (e.g., to identify when a specific person is speaking). Finally, speaker detection can be used to improve human computer interaction (HCI) by providing applications with the knowledge of when and where a user is speaking.

There has been a significant amount of work done in detecting faces from images and video for various purposes, and face detection techniques for the most part are well known in the art. There has also been a significant amount of work done in locating speakers using arrays of multiple microphones and sound source localization techniques. There are text-to-speech systems that utilize hand-coded phoneme-to-viseme rules to animate characters. In these hand coded rules that map phonemes to visimes extracting phonemes is error prone, as is extracting visimes. Additionally, extracting visimes requires greater image resolution than would typically be utilized in most applications where speaker detection is useful. It also requires a sophisticated model based feature extractor.

One significant work in speaker detection was described in a publication entitled "Look Who's Talking: Speaker Detection Using Video and Audio Correlation", by Ross Cutler and Larry Davis. In this publication a method of automatically detecting a person talking using video and audio was described. The audio visual correlation was learned using a simple, fully connected time delayed neural network (TDNN). Mel cepstrum coefficients were used as the audio features and the normalized cross correlation of pixel intensities in a window were used as the video features. In this method of speaker detection, the structure of the TDNN required it to have much training. This was partly because it was fully connected 10×10 hidden layer. Additionally, the Mel cepstrum coefficients that were used to represent the audio features were quite complex. Twelve different coefficients were required to represent the audio data, which required the TDNN to process a large number of parameters in order to learn the audio visual correlation in speaking. This speaker detection system was also negatively impacted by its ability to compensate for speaker head motion. The images that were used to train the TDNN and that were input all had no head movement. This makes this system impractical for speaker detection in most real world applications.

SUMMARY

The invention is directed toward a system and method for utilizing the correlation between video and audio input from a single microphone to detect speakers. A time-delayed neural network (TDNN) is trained to learn the audio-visual correlation in speaking. This trained TDNN is then used to search one or more audio-video inputs to detect when a person in the audio-video input is speaking. The audio-video speaker detection system of the present invention overcomes limitations in previous speaker detection system in that it has an improved TDNN structure, better video features, and simpler audio features. The TDNN is not fully connected, and takes less time to train. The speaker detection system and method of the invention employs a face detector to accurately locate the faces of speakers, and compensates for head motion by stabilizing mouth location.

In one aspect, the invention collects audio data generated from a microphone device. In another aspect, the invention collects video data and processes the data to determine a mouth location for a given speaker. The audio and video are input into a TDNN that processes the data to determine when a given person is speaking. The neural network processing is based upon a correlation to detected mouth movement from the video data and audio sounds detected by the microphone.

More specifically, to perform the task of speaker detection, a training database of video and associated audio clips of at least one person's face that is speaking are captured and preprocessed. Preprocessing involves reducing the noise of the audio signals. Then the audio and video data is segmented in order to remove portions of the data that are not needed in the training process. Segmenting the audio data signal involves determining the regions of speech and non-speech. Segmenting the video data signal involves determining at least one face and a mouth region within each determined face.

The audio-video speaker detection system and method according to the invention then computes audio and video features. In one embodiment of the invention, the audio feature is the energy over an audio frame (an audio is typically 33 ms for 30 FPS video) that is useful as it is the simplest possible, and is only one-dimensional. Besides the feature of energy over an audio frame, however, other types of audio features could be used, such as Mel cepstrum coefficients. However, using these other types of audio features are sure to be more complex, which will result in the requirement for more TDNN training than the simple audio feature of energy over an audio frame.

As mentioned above, the video features are determined by first using a face detector to locate a face in an audio video clip. Using the geometry of a typical face, the mouth location is then estimated. In one embodiment of the invention, the mouth image sequence is then stabilized using normalized correlation to remove any translational motion of the mouth caused by head movement. However, other stabilization techniques could be used to stabilize the mouth region. Finally, a Linear Discriminant Analysis (LDA) projection is used to determine if the mouth in the mouth image is open or closed. Based on the LDA projections, the values of the mouth openness for each segment of audio video data is designated in values ranging from −1 for the mouth being closed, to +1 for the mouth being open.

These audio and video features are then used to train the TDNN to recognize when a person in an input audio video clip is speaking.

Once the TDNN is trained, the trained TDNN is used to determine if a detected speaker in an audio-video sequence is speaking.

The described system assumes a single speaker (at a time) and no significant background noise. However, simultaneous speakers and background noise can be handled by first using a microphone array to beam form on each face detected and then evaluating the TDNN using the beam formed audio.

The system and method of the invention has many advantages. It allows for speaker detection in various applications such as video conferencing, video indexing, and so on. It allows fully-automatic speaker detection without requiring any manual intervention. No hand coding of phoneme to visime rules is necessary and the chosen video features can be extracted even at low resolutions. The invention also allows speaker location detection using only one microphone. Because a face detector is used, the search space used in classifying the audio and video data is reduced, making the system and method of the present invention much faster. Also, because the system can accommodate head motion, it is very practical for real world applications.

Since the method uses low-level correlation of audio/video to detect speakers, the accuracy of speaker detection is better than using audio alone (e.g., with a microphone array) or even high-level audio/video fusion (e.g., see Ross Cutler, Yong Rui, Anoop Gupta, J J Cadiz, Ivan Tashev, Li-wei He, Alex Colburn, Zhengyou Zhang, Zicheng Liu, Steve Silverberg. "Distributed Meetings: A Meeting Capture and Broadcasting System", ACM Multimedia, 2002).

Another inherent advantage of the audio video speaker detection method of the invention is the fact that speaker detection can be done without a microphone array. This allows speaker detection to be done on audio/video recorded with only a single microphone.

Although the audio speaker detection system and method of the present invention is described as employing a TDNN to learn the audio video correlation and classify input data, it is possible that other statistical learning engines, such as for example, a Support Vector Machine, could be used with similar results.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
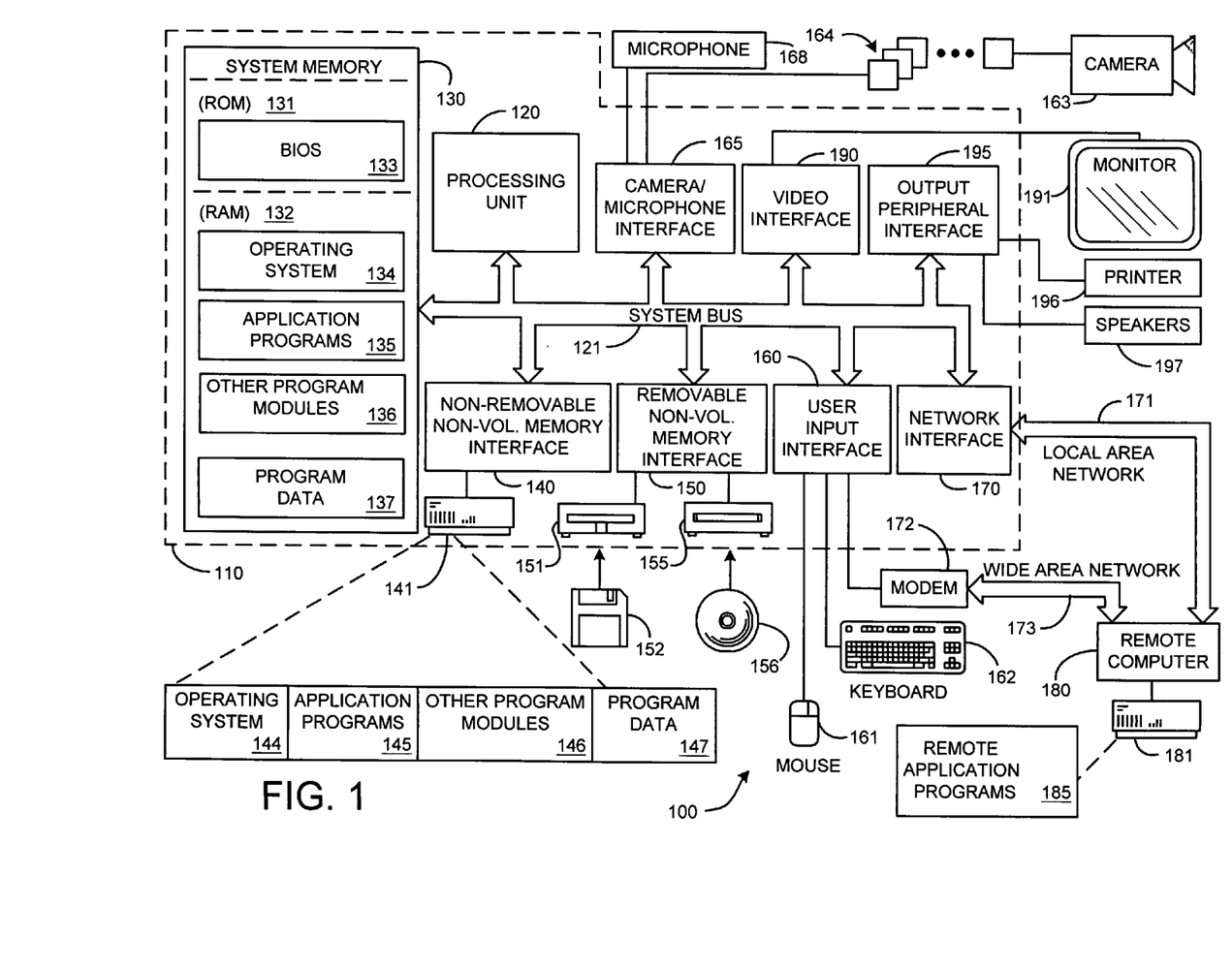
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. A microphone 168 may also be associated with the camera and input into the computer 110 with an interface 165 that is associated with one or more cameras. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 A System and Method for Audio/Video Speaker Detection.

2.1 General Overview.

Figure 2:
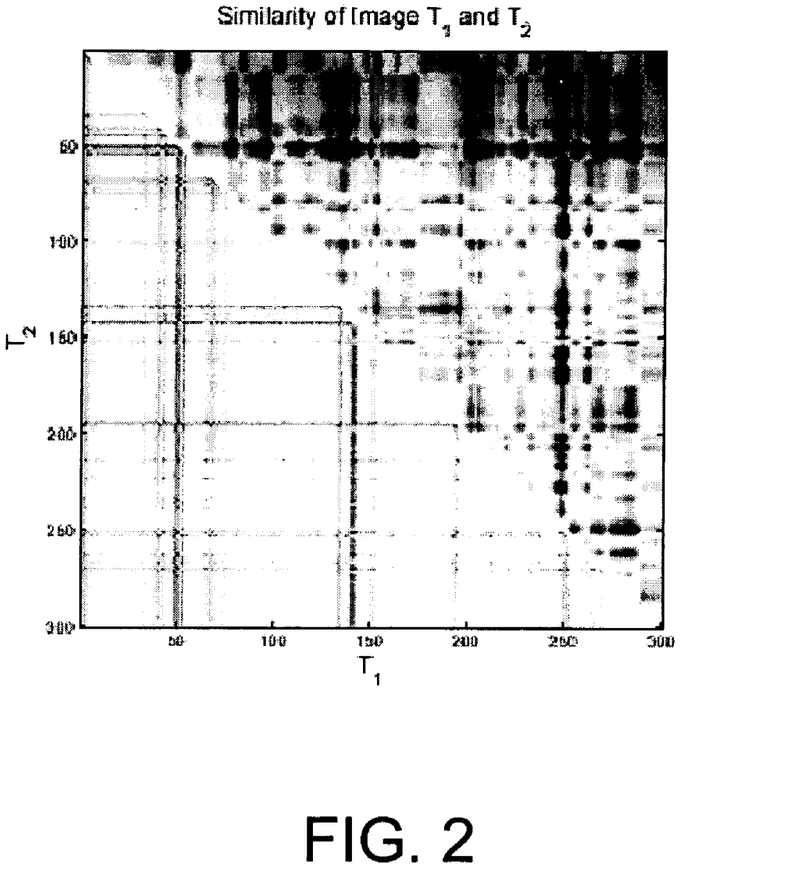
FIG. 2 shows a recurrence matrix of the mouth region image similarities and the corresponding audio data. This is a recurrence matrix of a 10 second talking sequence. The upper triangle is the similarity (correlation) of the mouth region for images at times $T_1$ and $T_2$, and the lower triangle is the similarity (Euclidean distance) of the corresponding audio signal at times $T_1$ and $T_2$. Whiter pixels denote higher similarity.

The system and method according to the invention exploits the correlation between mouth motions and audio data. FIG. 2 shows a recurrence matrix of the mouth region image similarities and the corresponding audio data. A recurrence matrix is a qualitative tool used to perform time series analysis of non-linear dynamic systems. In this case, the recurrence matrix R is defined by $R(t_1, t_2) = C(It_1, It_2)$ where C is the correlation of images $It_1$ and $It_2$. In this figure, it can be seen that times of change in the audio data are highly correlated with visual changes in the mouth. However, the relationship between the two signals is not simple, as changes in the audio signal do not necessarily imply changes in the visual signal (and vice versa), and the visual signal may lead or lag the audio signal significantly.

Figure 3:
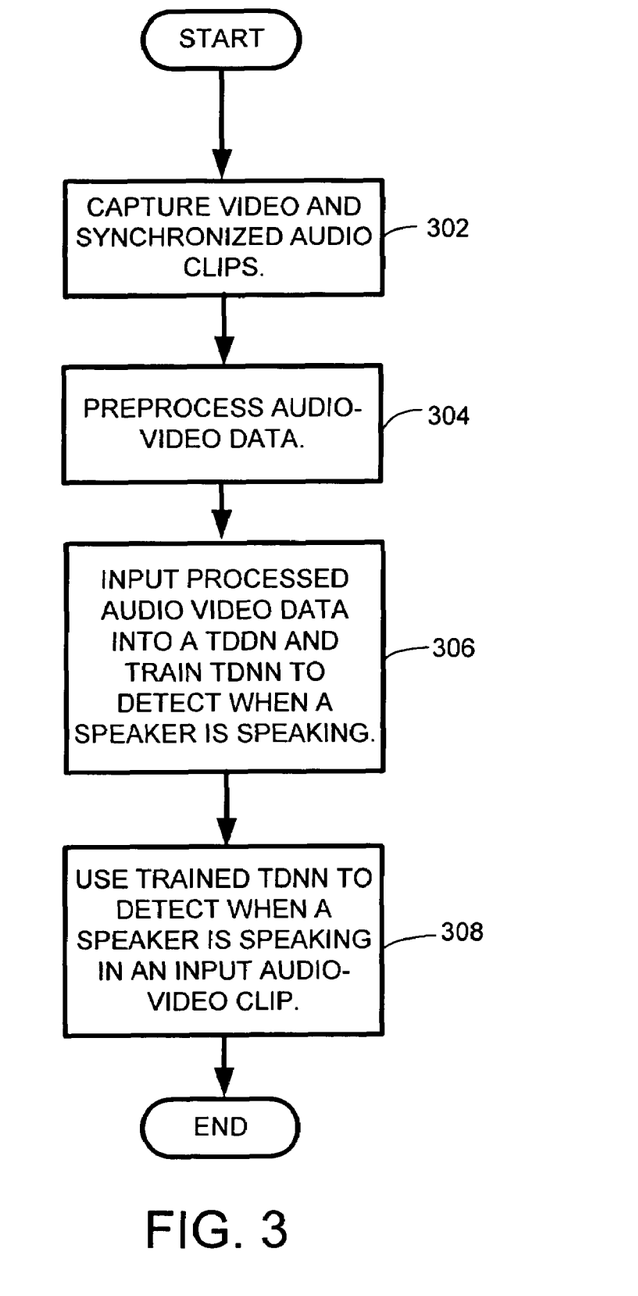
FIG. 3 is a flow diagram depicting the process actions of the overall process of training a Time Delay Neural Network to detect a person speaking and then using the system to perform this task in the system and method according to the invention.

The invention is directed toward a system and method for utilizing the aforementioned correlation between the audio and video input from a single microphone to detect speakers. A Time-Delayed Neural Network (TDNN) is trained to recognize the audio-visual correlation in speaking. This trained TDNN is then used to search one or more audio-video inputs to detect speaking people. More specifically, referring to FIG. 3, process action 302, video data and synchronized audio data are captured to create a training database that is used for training the TDNN. This captured data is then preprocessed (process action 304), and input into the TDNN during its training phase (process action 306). The trained TDNN can then be used on any synchronized audio and video input to determine which person in an audio video segment is speaking at a given time, as shown in process action 308. The neural network processing is based upon a correlation to detected mouth movement from the video data and audio sounds detected by a single microphone.

The assumptions and process actions of the audio video speaker detection system and method will be described further in the following paragraphs.

2.2 Assumptions.

The speaker detection system and method according to the invention assumes a single speaker (at a time) and no significant background noise. It should be noted that the invention can be extended to simultaneous speakers and background noise by first using a microphone array to beam form on each face detected and then evaluating the TDNN using the beam formed audio. Beamforming is a known technique of improving the sound quality of the speaker by filtering out sound not coming from the direction of the speaker.

The invention also assumes that the audio and video are synchronized. In one working embodiment of the invention, it is assumed that the lag of one to the other could be no more than 20 ms. Performance of the system degrades when the audio video synchronization exceeds 20 ms. However, the audio video synchronization tolerance can be increased by including out-of-sync audio video sequences in the training data.

2.3 Training Data Capture and Preprocessing.

Figure 4:
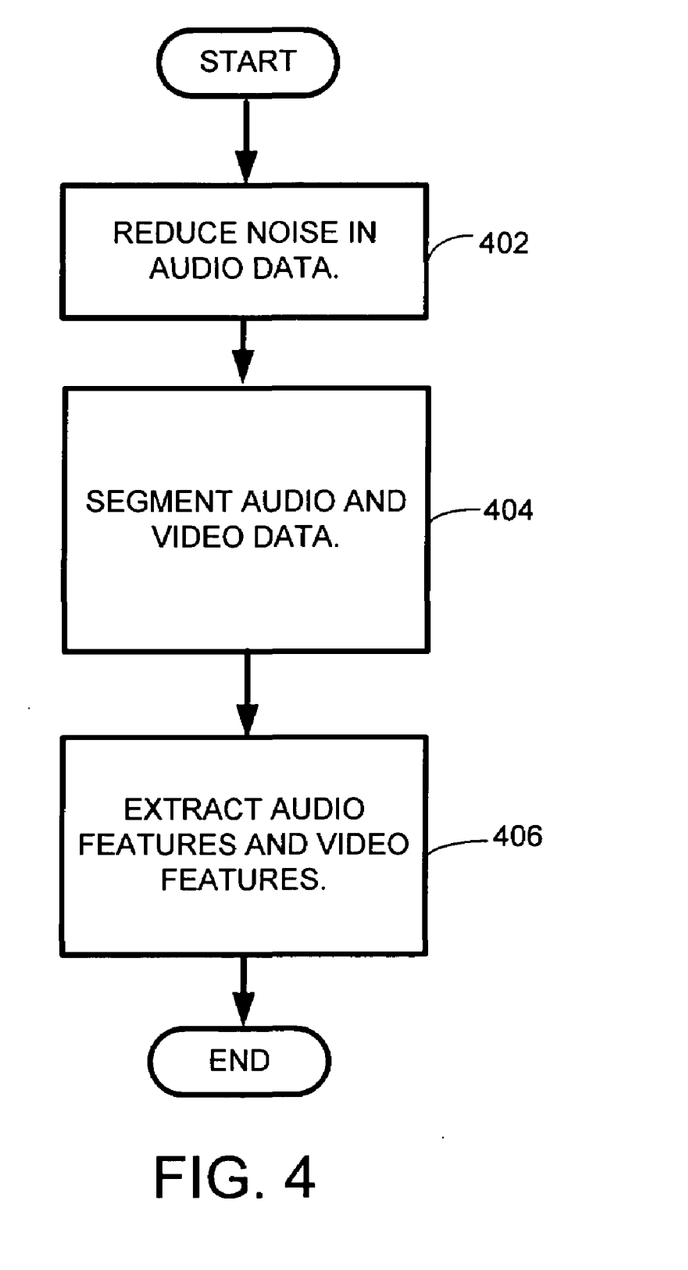
FIG. 4 is a flow diagram depicting the general process actions of preprocessing the audio and video data in the system and method according to the invention.

Before the TDNN can be used to temporally and spatially locate a person talking in a video sequence, the TDNN must be trained using a set of training data. In order to complete the training task, a database of video and associated audio clips must be captured. Additionally, some preprocessing should be performed to reduce the dimensionality of the data. As shown in FIG. 4, this preprocessing includes noise reduction of the audio (process action 402), segmentation of the audio and video data (process action 404), and feature extraction of both audio and video features (process action 406).

2.3.1 Training Data Capture.

The training video and associated audio clips can be captured in a variety of ways. A preferred method is to take a video of two speakers sitting in front of a camera and associated microphone and alternately speaking with no overlaps. However, one speaker, as well as more than two speakers, can also be so captured.

2.3.2. Preprocessing.

All training images are preprocessed to prepare them for eventual comparison to similarly prepared audio/video clips in order to achieve the goal of speaker detection. In general, the preprocessing involves noise reduction, segmentation and feature extraction so as to facilitate the comparison process. Standard noise reduction techniques (e.g., Weiner filtering) are used to reduce the noise in the audio and video data.

2.3.2.1 Segmentation.

Both audio and video data are then segmented prior to performing feature extraction to eliminate data not useful in subsequent processing. As the audio data is segmented to determine the regions of speech and non-speech in the audio signal. There are various conventional ways that this segmentation can be performed such as using energy, zero-crossing and periodicity measures.

Video segmentation is performed to locate the face and the mouth region thereof. Various known techniques can be used to locate the face. Such techniques can employ edge detection, color analysis and Principal Component Analysis to name a few. Once the face is detected and its position is tracked, the approximate location of the mouth is determined using the geometry of the face. The mouth region is then tracked relative to the face and is motion stabilized.

2.3.2.2 Feature Extraction.

Figure 5A:
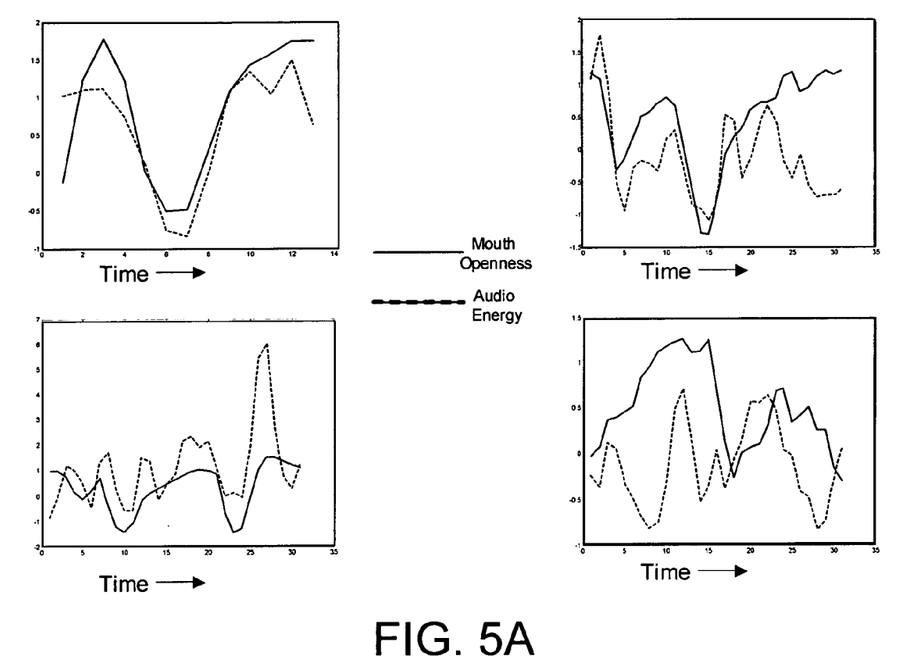
FIG. 5A shows the correlation between mouth openness and audio energy when a person is speaking.
Figure 5B:
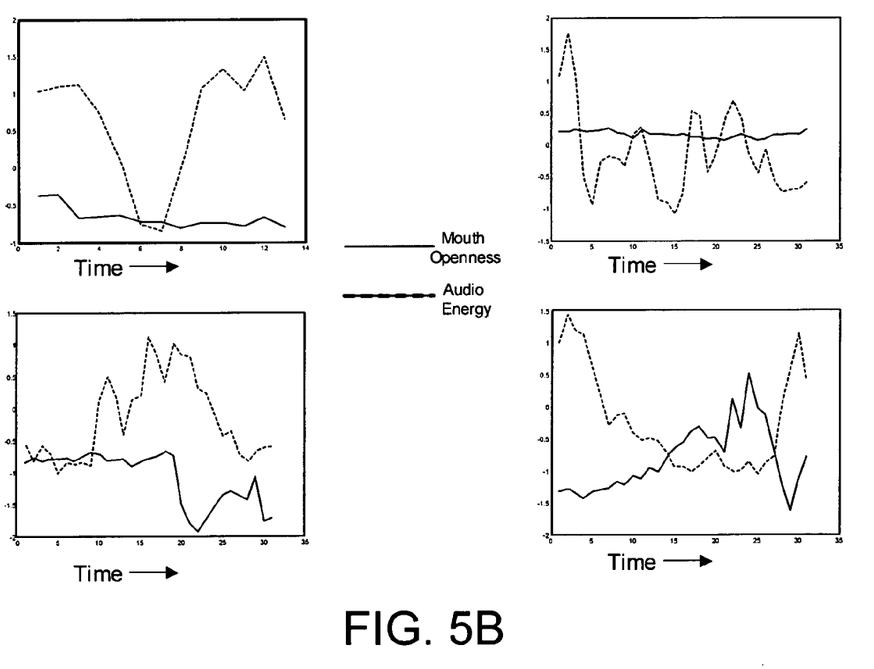
FIG. 5B shows that there is no such correlation when a person is not speaking.

In order to train the TDNN audio and video features are extracted in order to train the TDNN. Feature extraction is performed to reduce the dimensionality of the data and retain information for discrimination. As discussed above, it has been observed that the openness of the mouth is related to the amplitude of the audio when a person is speaking. Hence, the acoustic energy is used as an audio feature and mouth openness as a video feature. FIG. 5A shows the correlation between mouth openness and audio energy when a person is speaking. FIG. 5B shows that there is no such correlation when a person is not speaking. These features are extracted from the training clips and used to train the TDNN to recognize the ranges of open and closed mouths and associated audio signals.

Figure 6:
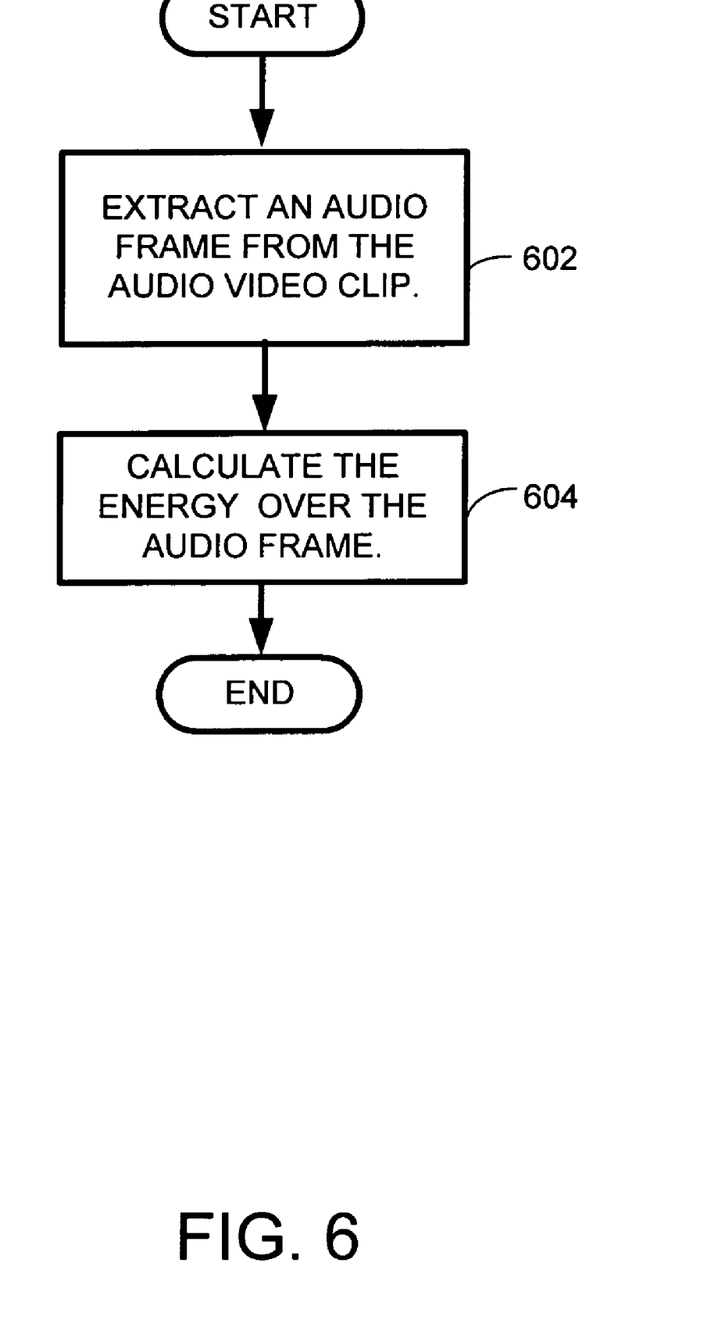
FIG. 6 is a flow diagram depicting the general process actions of extracting audio features in the system and method according to the invention.

The general process of extracting audio features is shown in FIG. 6. In one embodiment of the invention, the audio feature used is the energy over an audio frame (e.g., the energy in each frequency range). This feature of the energy over an audio frame is simple to compute, and is useful as it is only one-dimensional. Typically an audio frame is 33 ms for 30 FPS video. However, other frame lengths and other types of audio features could be used instead. For instance, more sophisticated features could be utilized which could enhance the performance of the speaker detection system and method, especially in the presence of noise (e.g., MFCCs). To extract the audio feature, an audio frame is extracted from the audio video clip, as shown in process action 602, and the energy over the audio frame is calculated, as shown in process action 604. Each audio frame is processed in this manner to provide a set of audio features.

Figure 7:
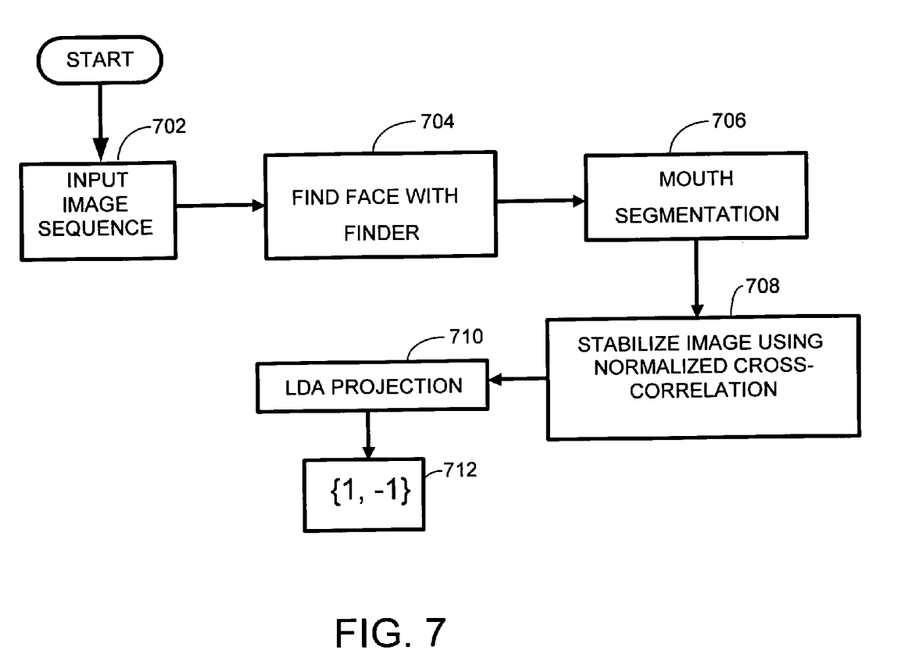
FIG. 7 is a flow diagram depicting the process actions of extracting the video features in the system and method according to the invention.
Figure 8:
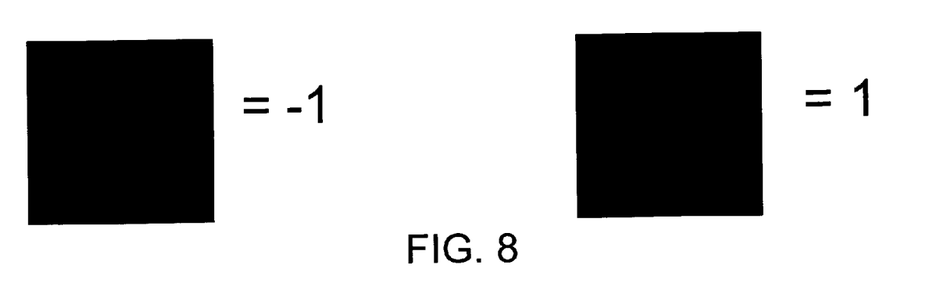
FIG. 8 shows a visual feature as a measure of how closed or open a mouth in an image is.

In choosing a visual feature, a feature was chosen that could be robustly determined even at low resolutions. In one embodiment of the invention, the system uses a face detector, mouth open/close detector, and mouth stabilizer to extract the video features. More specifically, as shown in FIG. 7, process action 702 the image sequence is input in the audio-video speaker detection system and method according to the invention. The video features are determined by first using a face detector to locate a face (process action 704). Any conventional face detector or face detection technique can be used to perform this function. Using the face detector to locate the face is advantageous in that it limits the search space and speeds up processing. Once the face has been located, as shown in process action 706, using the geometry of a typical face, the mouth location is estimated. In one working embodiment of the invention, a generic model of a head is used, and the mouth is presumed to be 0.7 of the head height from the top of the head. The width of the mouth is taken to one quarter of the height of the head and the height of the mouth is taken to be ⅒th of the head. There are numerous other ways the mouth windows encompassing the area of the mouth could be discerned however. These include use raw pixels, Principal Component Analysis, Discrete Cosine Transform (DCT), flow, etc. The mouth image sequence is then stabilized using normalized cross correlation to remove any translational motion of the mouth caused by head movement (process action 708). Since the location of the face is known, the relative location of the mouth region is stabilized. The mouth region is held in a constant relative position to the face, even when there is head motion. Although, the mouth region is stabilized using normalized cross correlation in one embodiment of the invention, it should be noted, however, that other types of stabilization techniques can be used. Finally, a Linear Discriminant Analysis (LDA) projection is used to determine if the mouth in the segmented mouth image is open or closed (process action 710). LDA is a linear projection of the data to a hyperplane that maximizes the ratio between-class scatter and within-class scatter of the data. Thus, LDA provides a linear transformation that helps in classification. In the invention, the LDA is used to project the cropped image of the mouth to a single number that represents how open or how closed the mouth is. The values of the mouth open to mouth closed range from −1 for the mouth being closed, to +1 for the mouth being open (process action 712). FIG. 8 shows a visual feature as a measure of how closed or open a mouth in an image is.

2.5 TTDN Training

Figure 9:
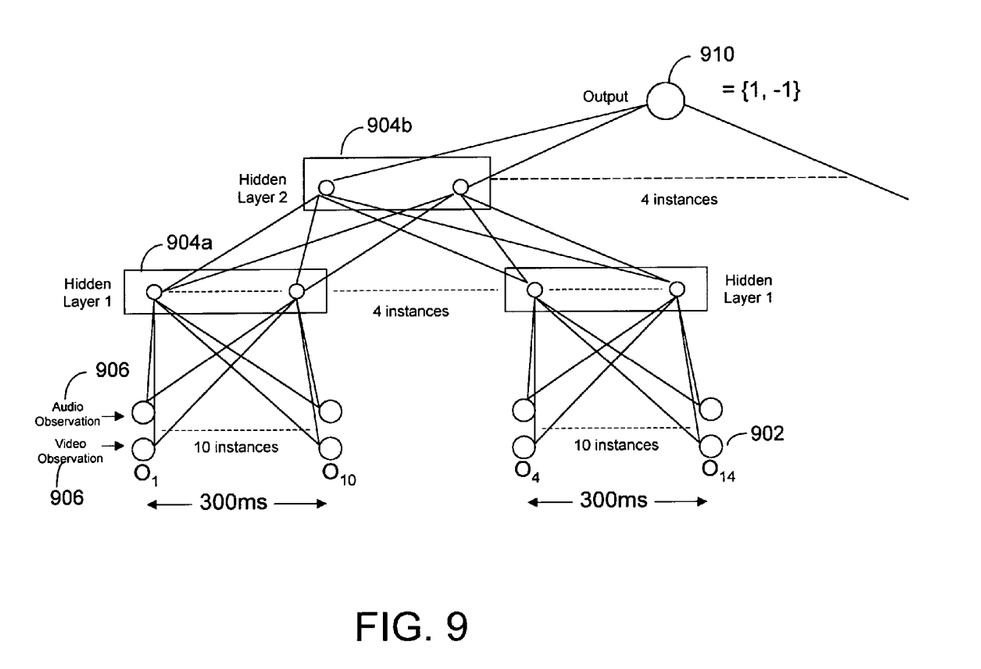
FIG. 9 is a schematic showing a TDNN used in one embodiment of the system and method according to the invention.

Neural networks are currently used prominently in voice recognition systems, image recognition systems, industrial robotics, medical imaging, data mining and aerospace applications and are well known. In the system and method according to the invention a Time Delay Neural Network (TDNN) is used to learn the context-dependent correlations between the audio and visual signals. A TDNN was chosen because it is shift invariant and has been previously used in other audio-vision applications. The Time Delay Neural Network employed in one embodiment of the invention is shown in FIG. 9. The input layer 902 has a receptive field size of 10 time samples; there are two hidden layers 904*a*, 904*b* with 8 nodes each and both have a receptive field size of 4. This embodiment of the TDNN looks at approximately 330 ms of audio data at a time.

As discussed previously, the audio feature of audio energy per frame and the video feature of the degree of mouth openness are used to train the TDNN. The TDNN has an input layer 902 consisting of a set of audio features 906 and a set of visual features 908. There is only a single output node $O_t$, 910 which indicates whether someone is speaking at time t or not.

The TDNN is trained using supervised learning and back propagation. In supervised learning, the correct results (target values, desired outputs) are known and are given to the NN during training so that the NN can adjust its weights to try match its outputs to the target values. After training, the NN is tested by giving it only input values, not target values, and seeing how close it comes to outputting the correct target values. Back propagation is the basis for training a supervised neural network. Static back propagation is used to produce an instantaneous mapping of a static (time independent) input to a static output. At the core of all back propagation methods is an application of the chain rule for ordered partial derivatives to calculate the sensitivity that a cost function has with respect to the internal states and weights of a network. In other words, the term back propagation is used to imply a backward pass of error to each internal node within the network, which is then used to calculate weight gradients for that node. Learning progresses by alternately propagating forward the activations and propagating backward the instantaneous errors. Specifically, for each image $I_t$, the output $O_t$ is set to 1 where a person is talking, and 0 otherwise. The training data consists of both positive data ($O_t=1$) and negative data ($O_t=0$).

2.6 Speaker Detection.

Figure 10:
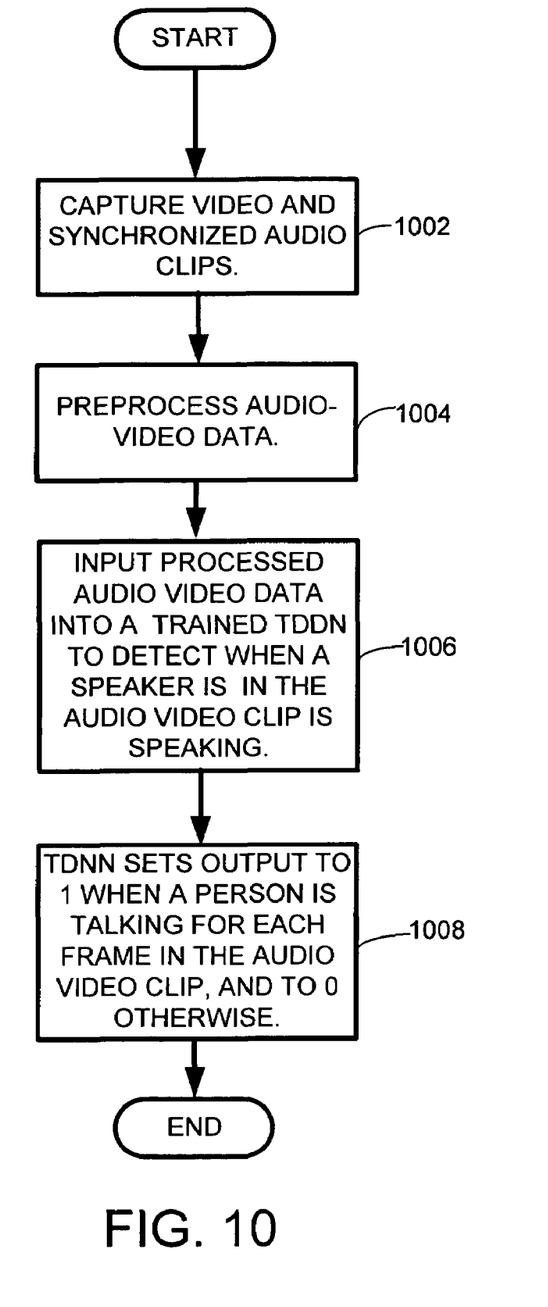
FIG. 10 is a flow diagram depicting the general process actions of using a trained TDNN to detect a person speaking in an audio video clip.

Once the TDNN has been trained, it is used to evaluate one or more audio-visual sequences to detect correlated mouth motion and audio that is indicative of a person talking. In general, as shown in FIG. 10, this process involves inputting an audio visual clip or segment (process action 1002), and preprocessing this data as discussed previously (e.g., using noise reduction, segmentation, and feature extraction) (process action 1004). The preprocessed data is then processed by the trained TDNN that determines when in the audio video clip a person is speaking (process action 1006). The TDNN sets the output between 0 and 1; if it is 1 when a there is a high probability that a person is talking and to 0 if there is a low probability, as shown in process action 1008. The trained TDNN can thus detect when and where a person in the audio-video segment is speaking. That is, the TDNN can locate the speaking person in the segment and pinpoint their face or their mouth. Generally the mouth region will consist of an area with TDNN values close to 1, surrounded by TDNN values close to 0.

Experimental studies were conducted to test the effectiveness of one embodiment of the audio video speaker detection system and method according to the invention. A video was taken of two speakers alternately speaking with no overlaps. The database for the experiment consisted of 71 segments of 1 second long video. As a training database for the neural network used, 50 percent of the segments were randomly selected from the captured video segments. The remaining half of the video segments was used as the testing database.

Figure 11A:
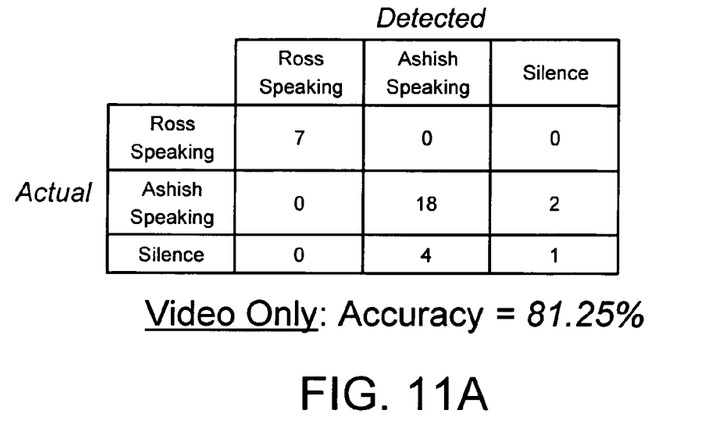
FIG. 11A shows the accuracy of the TDNN of one embodiment of the invention in predicting who was speaking at a given time based on video only data.
Figure 11B:
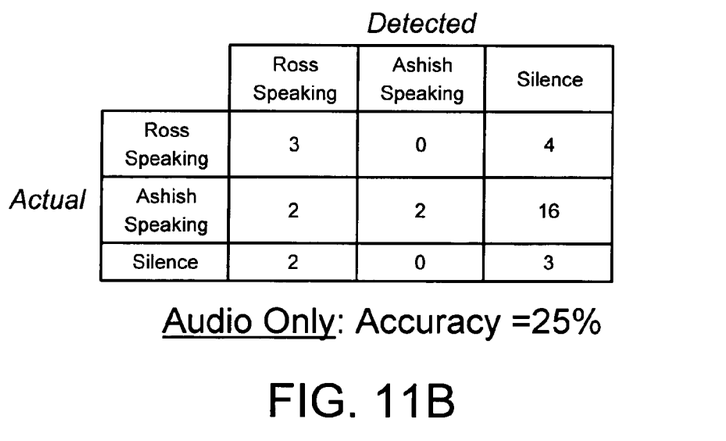
FIG. 11B shows the accuracy of the TDNN of one embodiment of the invention in predicting who is speaking based on the audio data only.
Figure 11C:
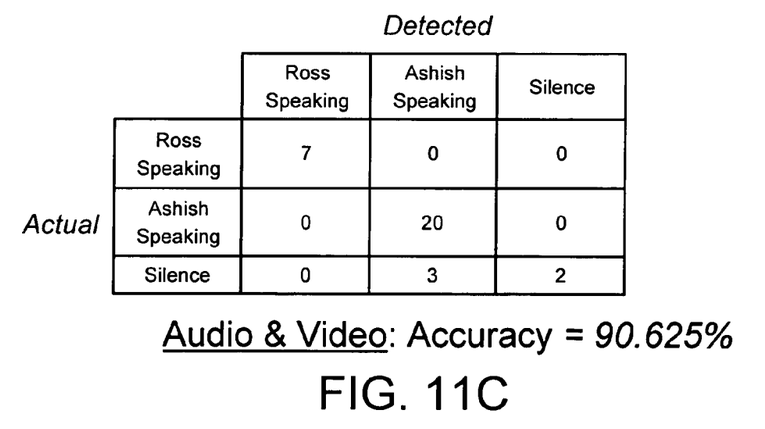
FIG. 11C shows the accuracy of the TDNN or one embodiment of the invention in predicting who is speaking based on both the audio and the video features.

FIG. 11A shows the accuracy of the TDNN in predicting who was speaking at a given time based on video only data. This accuracy was 81.25%. FIG. 11B shows the accuracy of the TDNN in predicting who is speaking based on the audio data only. This accuracy was 25%. FIG. 11C shows the accuracy of the TDNN in predicting who is speaking based on both the audio and the video features. The resulting accuracy of 90.625% was significantly better than was achieved using the video or audio data alone.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Wherefore, what is claimed is:

1. A computer-implemented process for detecting speech, comprising the process actions of:
   inputting associated audio and video training data containing a person's face that is periodically speaking; and
   using said audio and video signals to train a time delay neural network to determine when a person is speaking, wherein said training comprises the following process actions:
      computing audio features from said audio training data wherein said audio feature is the energy over an audio frame;
      computing video features from said video training signals wherein said video feature is the degree to which said person's mouth is open or closed; and
      correlating said audio features and video features to determine when a person is speaking.

2. The computer-implemented process of claim 1 further comprising the process action of preprocessing the audio and video signals prior to using said audio and video signals to train a Time Delay Neural Network.

3. The computer-implemented process of claim 2 wherein said process action of preprocessing the audio and video signals comprises the process actions of:
   reducing the noise of the audio signals;
   segmenting the audio data signals;
   segmenting the video data signals;
   extracting audio features; and
   extracting video features.

4. The computer-implemented process of claim 3 wherein the process action of segmenting the audio data signal comprises the process action of segmenting the audio data to determine regions of speech and non-speech.

5. The computer-implemented process of claim 3 wherein the process action of segmenting the video data signal comprises the process action of segmenting the video data to determine at least one face and a mouth region within said determined faces.

6. The computer-implemented process of claim 1 wherein the process action of computing video features from said video training signals comprises the process actions of:
   using a face detector to locate a face in said video training signals;
   using the geometry of a typical face to estimate the location of a mouth and extracting a mouth image;
   stabilizing the mouth image to remove an translational motion of the mouth caused by head movement;
   using a Linear Discriminant Analysis (LDA) projection to determine if the mouth in the segmented mouth image is open or closed; and
   designating values of mouth openness wherein the values range from −1 for the mouth being closed, to +1 for the mouth being open.

7. The computer-implemented process of claim 6 wherein the process action of stabilizing the mouth image comprises the process action of using normalized cross correlation to remove any of said translational movement.

8. The computer-implemented process of claim 6 wherein the process action of using the geometry of a typical face to estimate the location of a mouth and extracting a mouth image comprises the process actions of:
   using a generic model of a head, designating the mouth region to be centered at 0.7 of the head height from the top of the head model;
   designating the width of the mouth as one quarter of the height of the head; and
   designating the height of the mouth as 1/10th of the height of the head model.

9. The computer-process of claim 1 further comprising the process actions of:
   inputting an associated audio and video sequence of a person periodically speaking;
   using said trained Time Delay Neural Network to determine when in said audio and video sequence said person is speaking.

10. The computer-implemented process of claim 9 further comprising the process action of preprocessing the associated audio and video sequence prior to using said trained Time Delay Neural Network to determine if a person is speaking.

11. The computer-implemented process of claim 1 wherein said process action of preprocessing the audio and video sequence comprises the process actions of:

reducing the noise of the audio in said sequence;
segmenting the audio data in said sequence;
segmenting the video signals in said sequence;
extracting audio features from said sequence; and
extracting video features from said sequence.

12. A computer-readable medium having an encoded computer program that is encoded with computer executable instructions to perform the process recited in claim 9.

13. A computer-readable medium encoded with computer executable instructions for use in detecting when a person in a synchronized audio video clip is speaking, said computer executable instructions comprising:
inputting one or more captured video and synchronized audio dips,
segmenting said audio and video clips to remove portions of said video and synchronized audio clips not needed in determining if a speaker in the captured video and synchronized audio clips is speaking;
extracting audio and video features in said captured video and synchronized audio dips to be used in determining if a speaker in the captured; and wherein an audio feature is the energy over an audio frame and wherein said video feature is the openness of a person's mouth;
training a Time Delay Neural Network to determine when a person is speaking using said extracted audio and video features.

14. The computer-readable medium of claim 13 wherein the instruction for training a Time Delay Neural Network further comprises a sub-instruction for correlating said audio features and video features to determine when a person is speaking.

15. The computer-readable medium of claim 13, further comprising instructions for:
inputting a captured video and synchronized audio clip for which it is desired to detect a person speaking;
using said trained Time Delay Neural Network to determine when a person is speaking in the captured video and synchronized audio clip for which it is desired to detect a person speaking by using said extracted audio and video features.

16. The computer-readable medium of claim 13 further comprising an instruction for reducing noise in said audio video clips prior to said instruction for segmenting said audio and video clips.

17. The computer-readable medium of claim 13 wherein the process action of extracting audio and video features in said captured video and comprises sub-instructions for extracting video features comprising:
using a face detector to locate a face in said video training signals;
using the geometry of a typical face to estimate the location of a mouth and extracting a mouth image;
stabilizing the mouth image to remove any translational motion of the mouth caused by head movement;
using a Linear Discriminant Analysis (LDA) projection to determine if the mouth in the segmented mouth image is open or closed; and
designating values of mouth openness wherein the values range from −1 for the mouth being closed, to +1 for the mouth being open.

18. The computer-readable medium of claim 17 wherein said sub-instruction for stabilizing the mouth image to remove any translational motion of the mouth caused by head movement employs normalized cross correlation.

19. A computer-readable medium encoded with computer executable instructions for use in detecting when a person in a synchronized audio video clip is speaking, said computer executable instructions comprising:
inputting one or more captured video and synchronized audio clips,
segmenting said audio and video clips to remove portions of said video and synchronized audio clips not needed in determining if a speaker in the captured video and synchronized audio clips is speaking;
extracting audio and video features in said captured video and synchronized audio clips to be used in determining if a speaker in the captured; wherein said audio feature is the energy over an audio frame and wherein said video feature is the openness of a person's mouth, comprising sub-instructions for extracting video features comprising:
using a face detector to locate a face in said video training signals;
using the geometry of a typical face to estimate the location of a mouth and extracting a mouth image, wherein said sub-instruction for using the geometry of a typical face to estimate the location of a mouth and extracting a mouth image, comprises sub-instructions for:
using a generic model of a head, designating the mouth region to be centered at a given distance of the head height from the top of the head model;
designating the width of the mouth as a percentage of the height of the head; and
designating the height of the mouth as a percentage of the height of the head model;
stabilizing the mouth image to remove any translational motion of the mouth caused by head movement;
using a Linear Discriminant Analysis (LDA) projection to determine if the mouth in the segmented mouth image is open or closed; and
designating values of mouth openness wherein the values range from −1 for the mouth being closed to +1 for the mouth being open; and
training a Time Delay Neural Network to determine when a person is speaking using said extracted audio and video features.

20. A system for detecting a speaker in a video segment that is synchronized with associated audio, the system comprising
a general purpose computing device; and
a computer readable medium encoded with instructions capable of being executed by a computing device, wherein the computing device is directed by the program modules of the computer program to,
input one or more captured video and synchronized audio segments,
segment said audio and video segments to remove portions of said video and synchronized audio segments not needed in determining if a speaker in the captured video and synchronized audio segments is speaking;
extra audio and video features in said captured video and synchronized audio segments to be used in determining if a speaker in the captured video and synchronized audio segments is speaking, wherein said audio feature is the energy over an audio frame and said video feature is the openness of a person's mouth in said video and synchronized audio segments;
train a Time Delay Neural Network to determine when a person is speaking using said extracted audio and video features;
input a captured video and synchronized audio clip for which it is desired to detect a person speaking; and use said trained Time Delay Neural Network to determine when a person is speaking in the captured video and synchronized audio segments for which it is desired to detect a person speaking.

21. The system of claim 20 wherein the module for using said trained Time Delay Neural Network comprises a sub-module that outputs a 1 when a person is talking for each frame in said captured video and synchronized audio segments for which it is desired to detect a person speaking, and outputs a 0 when no person is talking.

22. The system of claim 20 wherein said Time Delay Neural Network comprises:
an input layer;
two hidden layers; and
one output, wherein said output is set to 0 when no person in the video and synchronized audio segment is speaking; and wherein said output is set to 1 when a person in the video and synchronized audio segment is speaking.

23. The system of claim 20 wherein the module for extracting audio and video features comprises sub-modules to extract the video features comprising:
using a face detector to locate a face in said video training signals;
using the geometry of a typical face to estimate the location of a mouth and extracting a mouth image;
stabilizing the mouth image to remove any translational motion of the mouth caused by head movement; and
using a Linear Discriminant Analysis (LDA) projection to determine if the mouth in the segmented mouth image is open or closed.

24. A computer-implemented process for detecting speech in an audio-visual sequence wherein more than one person is speaking at a time, comprising the process actions of:
inputting associated audio and video training data containing more than one person's face wherein each person is periodically speaking at the same time as the other person or persons; and
using said audio and video signals to train a time delay neural network to determine which person is speaking at a given time, wherein said training comprises the following process actions:
computing audio features from said audio training data wherein said audio feature is the energy over an audio frame;
computing video features from said video training signals to determine whether a given person's mouth is open or closed; and
correlating said audio features and video features to determine when a given person is speaking.

25. The computer-implemented process of claim 24 wherein the process action of computing video features from said video training signals comprises the process actions of:
using a face detector to locate each face in said video training signals;
using a microphone array to beam form on each face detected thereby filtering out sound not coming from the direction of the speaker to create beam formed audio training data;
using the geometry of a typical face to estimate the location of a mouth and extracting a mouth image;
stabilizing the mouth image to remove any translational motion of the mouth caused by head movement;
using a Linear Discriminant Analysis (LDA) projection to determine if the mouth in the segmented mouth image is open or closed; and
designating values of mouth openness wherein the values range from −1 for the mouth being, closed, to +1 for the mouth being open.

26. The computer-implemented process or claim 25 wherein said audio feature is computed using said beam formed audio training data.

27. The computer-implemented process of claim 26 further comprising the process actions of:
inputting an associated audio and video sequence of more than one person periodically speaking;
using said trained Time Delay Neural Network to determine when in said audio and video sequence each person is speaking.

28. A computer-implemented process for detecting speech, comprising the process actions of:
inputting associated audio and video training data containing a person's face that is periodically speaking; and
using said audio and video signals to train a statistical learning engine to determine when a person is speaking, wherein said training comprises the following process actions:
computing audio features from said audio training, wherein said audio feature is the acoustical energy over an entire audio frame;
computing video features from said video training signals wherein said video feature is the degree to which said person's mouth is open or closed; and
correlating said audio features and video features to determine when a person is speaking.

29. The computer-implemented process of claim 28 wherein said statistical learning engine is a Time Delay Neural Network.

30. The computer-implemented process of claim 28 wherein said statistical learning engine is a Support Vector Machine.

* * * * *